United States Patent [19]

Weinmann et al.

[11] Patent Number: 4,849,116

[45] Date of Patent: Jul. 18, 1989

[54] PROCESS AND A PLANT FOR SEPARATING LOW DENSITY MATERIAL FROM SUBSTRATE MIXTURES

[75] Inventors: Alfred Weinmann; Josef Steinegger, both of Graz; Peter Scheucher, Kumberg; Roland Konstantiniuk; Wolfgang Leutzendorff, both of Graz; Hubert Hermann, Krottendorf, all of Austria

[73] Assignee: Maschinenfabrik Andritz Actiengesellschaft, Austria

[21] Appl. No.: 54,545

[22] Filed: May 27, 1987

[30] Foreign Application Priority Data

May 28, 1986 [AT] Austria ................... 1441/86

[51] Int. Cl.⁴ .................... B01D 21/00; B03B 5/28
[52] U.S. Cl. ...................... 210/770; 210/776; 210/787; 210/804; 210/805; 210/806; 210/182; 210/195.1; 210/202; 210/221.2; 210/257.1; 210/259
[58] Field of Search ............... 210/770, 776, 787, 788, 210/804–806, 195.1, 202, 205, 221.2, 257.1, 258, 259, 512.1

[56] References Cited

U.S. PATENT DOCUMENTS

| 2,654,479 | 10/1953 | Driessen | 210/804 X |
|---|---|---|---|
| 3,032,545 | 5/1962 | Renberg | 210/787 X |
| 3,265,212 | 8/1966 | Bonsall, Jr. | 210/787 |
| 3,456,798 | 7/1969 | Urdanoff | 210/776 |
| 3,540,588 | 11/1970 | Estabrook | 210/805 X |
| 3,679,051 | 7/1972 | Larson et al. | 210/805 |
| 3,890,229 | 6/1975 | Eder | 210/787 X |
| 4,350,596 | 9/1982 | Kennedy, Jr. | 210/804 X |
| 4,425,228 | 1/1984 | Lynn et al. | 210/787 X |
| 4,541,933 | 9/1985 | Arnold et al. | 210/787 X |
| 4,661,243 | 4/1987 | Hotz et al. | 210/787 X |

FOREIGN PATENT DOCUMENTS

| 2614021 | 10/1976 | Fed. Rep. of Germany | 210/770 |
|---|---|---|---|
| 11567 | 1/1979 | Japan | 210/770 |
| 144038 | 11/1979 | Japan | 210/787 |

Primary Examiner—Robert Spitzer
Attorney, Agent, or Firm—Townsend and Townsend

[57] ABSTRACT

The invention relates to a process and a plant for separating low density material, in particular plastics, in particular with a density of less than 1, from substrate mixtures, preferably from waste material fractions or presorted garbage fractions optionally containing essential portions of plastics or optionally presorted to paper/plastics fractions, wherein a gravity separation, in particular a sink-float separation, is carried out and the low density material phase, in particular polyolefin plastics, is withdrawn and optionally further processed as a separate fraction after drying.

According to the invention, the separating effect and the cleaning of the low density material phase withdrawn are increased by carrying out at least one centrifugal separation, preferably in a hydrocyclone, in addition to at least one gravity separation, preferably in a sink-float basin.

48 Claims, 5 Drawing Sheets

PROCESS AND A PLANT FOR SEPARATING LOW DENSITY MATERIAL FROM SUBSTRATE MIXTURES

The invention relates to a process for separating light matter, i.e. low density materials, preferably plastics, in particular those with a density of less than 1, from substrate mixtures, preferably from waste matter fractions or presorted garbage fractions which optionally contain essential proportions of plastics or were optionally presorted to paper/plastics fractions, in which process a gravity separation, in particular a sink-float separation, is used and the low density phase, in particular polyolefin plastics, is withdrawn and optionally further processed as a separate fraction after drying. The invention further relates to a plant for carrying out the process.

The substrate mixture is subjected to a sink-float separation in a manner known per se and the floating light matter phase is withdrawn. It was found, however, that this does not result in an adequate separating effect or sufficient cleaning of the light matter phase withdrawn unless the plants are unreasonably overdimensioned and operated at considerable energy consumption. According to the invention, a process of the type initially mentioned is characterized in that in addition to at least one gravity separation, preferably in a sink-float basin, at least one centrifugal separation, preferably in a hydrocyclone, is carried out. The gravity separation preferably precedes the centrifugal separation. Quite unexpectedly for the man of the art, the combination of these two separating processes results in a separating effect of nearly 100 percent. At the same time, the light matter withdrawn is cleaned to an extent which makes further treatment in order to remove adhering foreign matter or contaminants virtually unnecessary.

The substrate mixtures used may be waste material fractions or domestic garbage fractions which for instance contain a comparatively high proportion of plastics after presorting. It is possible to separate presorted plastics fractions, for instance separate lighter polyolefins from heavier PVC plastics or lighterweight plastics sheets from a mixture which contains paper and PVC sheets and polyamides in addition to these light plastics sheets. In any case, the result is an excellent separation of the light matter fraction from the heavy matter fraction which also contains sand, fibers, rocks and the like, at simultaneous cleaning of the light matter fraction and nearly complete removal of undesirable foreign matter.

In order to increase the separating effect, it is convenient to charge the sink-float separation with a precomminuted, dry and/or wet-ground substrate mixture to which liquid is added, preferably between the pre-comminuting and the charging into the sink-float basin, optionally under simultaneous agitation.

In a preferred embodiment of the invention, it is provided to treat the substrate mixtures subjected to sink-float separation with jets of liquid during their presence in the sink-float basin, in particular use the jets of liquid both to advance the substrate mixtures and to hold them beneath the surface of the liquid in the sink-float basin. This results in a particularly thorough separation and cleaning of the substrate mixtures charged.

In order to achieve an adequate retention time, it is convenient to make the substrate mixture move in the sink-float basin along a coil or meander-shaped path.

It is further convenient to dry the light matter phase by means of hot air subsequent to centrifugal separation, optionally after further reduction of its liquid content, for instance by gravity filtration, squeezing out of liquid or the like. For hot air drying, it is preferred to introduce the humid light matter phase into a mixing zone provided with obstacles, in particular deflections, in which zone the light matter phase is entrained against gravity by a stream of hot air preferably caused to flow with a multitude of sudden deflections, in particular along a zig-zag course, and dried there. It is energetically convenient to move the drying air in a half-open cycle, with part of the air loaded with moisture from the light matter phase being withdrawn as exhaust air and replaced by dry or drier fresh air, in particular in a spot upstream of the withdrawal site of the moist air from the cycle, to warm the stream of air prior to its contact with the light matter phase and to optionally discharge the dried light matter phase from the stream of hot air in a spot upstream of the withdrawal site of the exhaust air from the cycle.

Finally, it is provided to agglomerate the dried light matter phase under the influence of heat and to subsequently extrude the light matter agglomerate in a manner known per se, in particular after admixing of desired components such as granulated plastics, stabilizers, lubricants and the like, and is processed to the desired final or intermediary product, for instance ropes or sheets, in particular according to the filmblowing extrusion process.

A plant for carrying out the process according to the invention is characterized in that at least one centrifugal separating means, preferably a hydrocyclone, is provided in addition to at least one gravity separating means. It is preferred to arrange the centrifugal separating means, in particular the hydrocyclone, downstream of the gravity separating means, in particular the sink-float basin. In a plant according to the invention of this type, a virtually complete separation of the light matter from the high density material, accompanied by a nearly 100 percent removal of dirt from the light matter withdrawn, is rapidly achieved.

For dehydrating the light matter phase, it is preferred to provide dehydrating means, such as a vibrating screen or screen belt press, downstream of the hydrocyclone. The screen belt press may by provided with a single pair of press rollers of which at least the upper roller has a metal surface, or the upper roller is positioned closer to the inlet end of the screen belt press than the lower roller and optionally the screen belt is moved to the pressing zone ascendingly.

In a preferred embodiment of the invention, the sink-float basin is provided with at least one, preferably a plurality of, jet nozzle(s) by means of which jets of liquid can be sprayed onto the surface of the liquid in the sink-float basin, the jets of liquid optionally having a directional component conveying the substrate mixtures in the direction of the discharge end of the sink-float basin and whirling the substrate mixtures so treated and forcing them beneath the surface of the liquid, with a plurality of jet nozzles optionally disposed side by side and directed to the liquid surface at different or adjustable angles optionally arranged across the width of the sink-float basin. In a preferred embodiment, the sink-float basin is subdivided into a number of adjacent, coil or meander-shaped zones. It is convenient for the performance of the process to select the conveying speed and the conveying path in the sink-float basin and its depth so that the retention time in the basin is at least as long as the sedimentation time of the sinking components.

It is further convenient to pass the largely dehydrated light matter phase to a hot air drier which may comprise an essentially vertically arranged air canal in particular provided with a plurality of obstacles, preferably sudden deflections, in particular sharp or slightly rounded edges or zig-zag-shaped deflections, with an air stream directed upwards into which the light density material phase to be dried is introduced and freed of humidity while entrained by the air stream being maintained in the air canal. It is particularly convenient to provide the air canal with a plurality of edges causing flow breakaway so that the particles touch or are propelled against the opposite surface; particles which are still too wet drop back into the ascending air stream. The edges may be sharp or slightly rounded. It is important to provide for the sudden deflection of the air stream, in particular over edges, in order to achieve a good whirling effect.

From the hot air drier, the low density particles discharged from it are passed to an agglomerating unit, in particular a screw conveyor from which they are optionally passed to plastics processing means known per se for agglomerated granules.

The invention is explained in detail in the following under reference to the accompanying drawing.

FIGS. 1 a, b and c show a diagram of a plant according to the invention;

FIGS. 2 a, b and c show a sink-float basin in sectional view and a detailed view thereof;

Figure 1A:
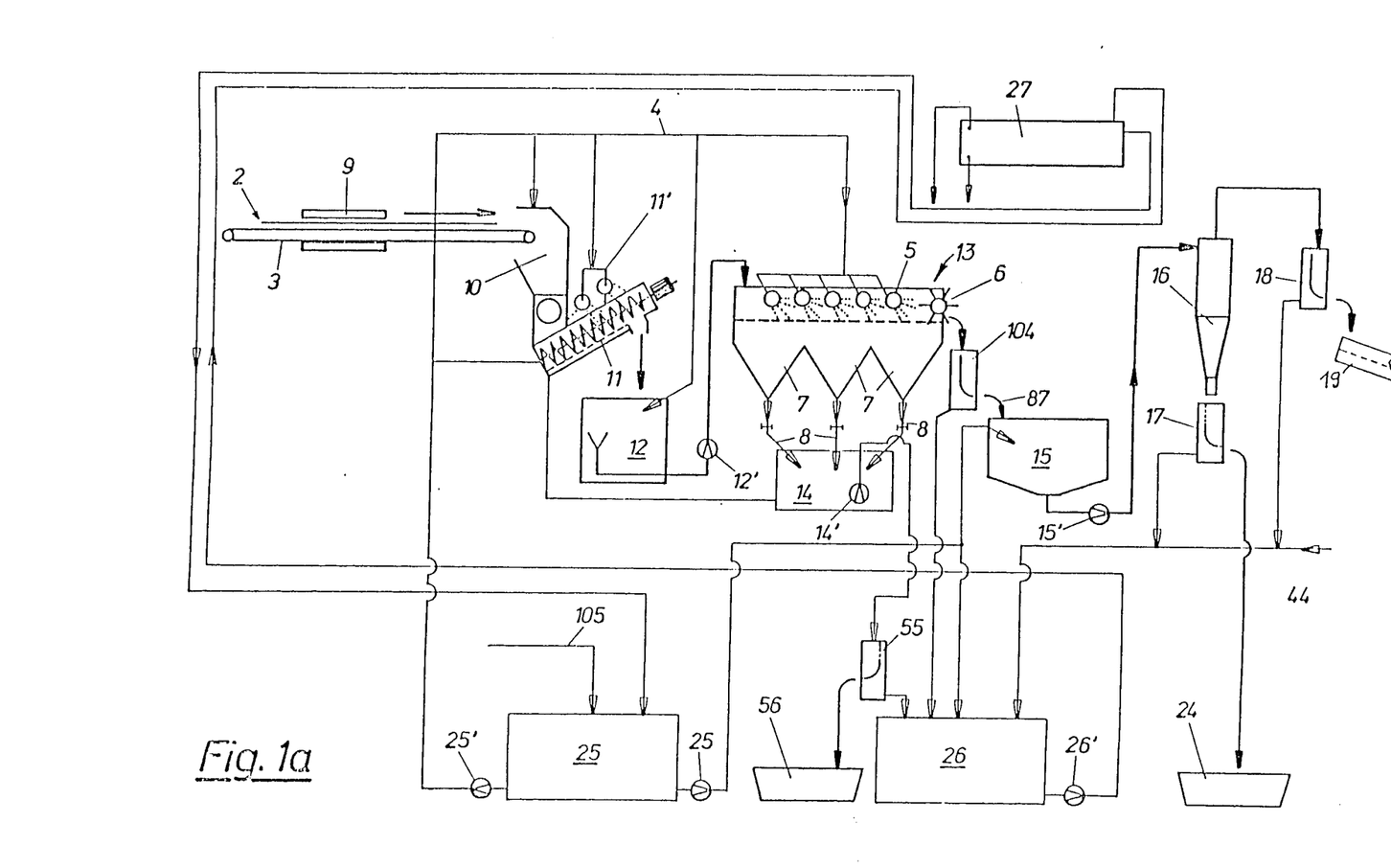
Figure 1B:
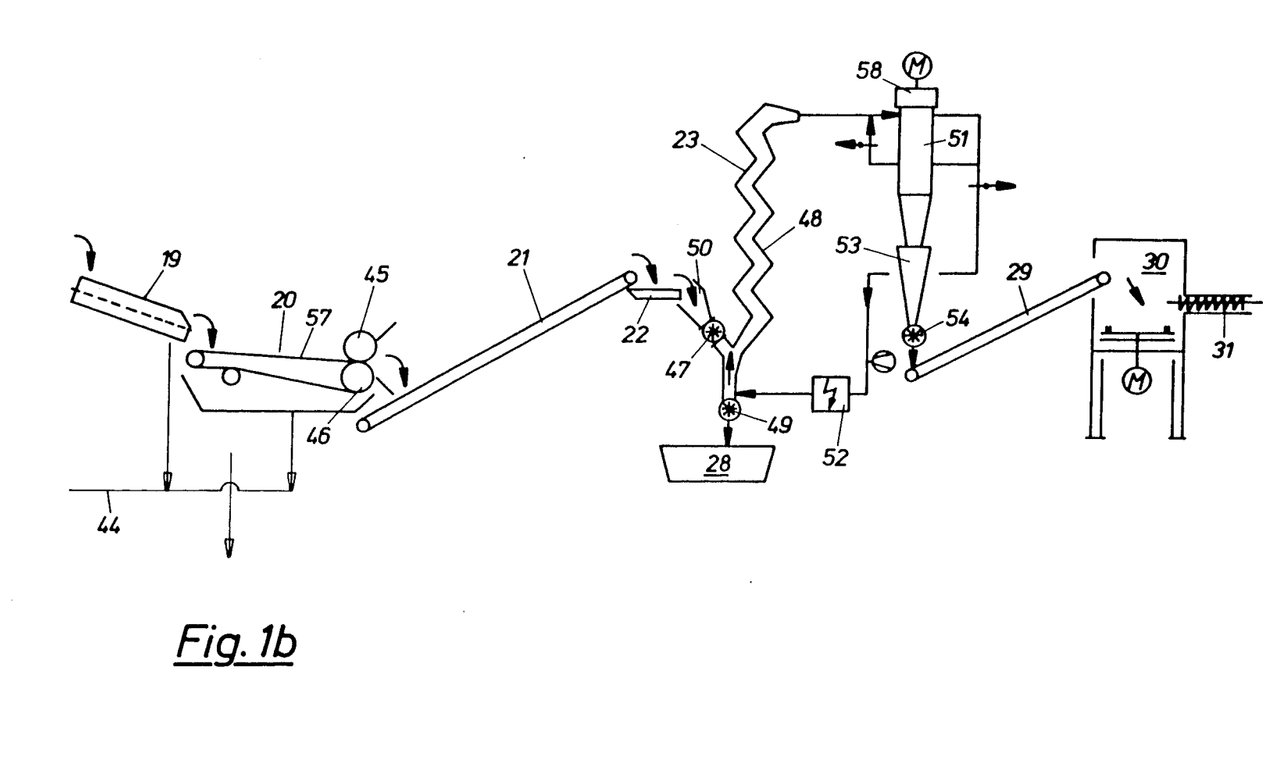
Figure 1C:
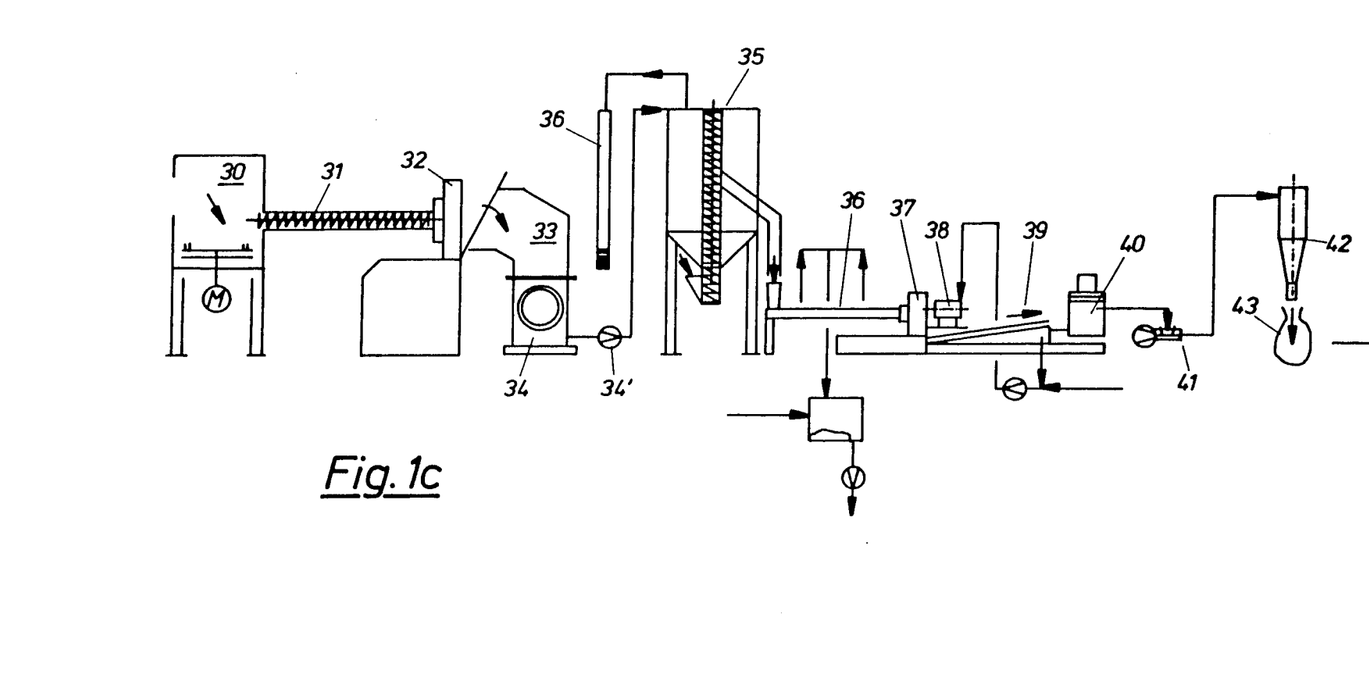

Substrate mixtures to be treated or separated and containing low density material, preferably plastics, in particular polyolefin sheets, and preferably obtained from waste matter fractions or presorted garbage fractions and essentially containing e.g. more than 80 percent, preferably more than 90 percent, of plastics or consisting of presorted paper/plastics fractions (PVC, paper, polyolefins), are placed at 2 onto a conveyor belt 3 to which a metal separator 9 is associated for removing metallic, in particular magnetizable, components. The substrate mixture is then charged into a wet-grinding mill 10 in which the paper is broken up into pieces about the size of the palm of a hand and the plastics into pieces about the size of a fingernail. From the wet-grinding mill 10, the crushed substrate is passed over a paddle screw 11, at simultaneous water supply 11', to a mixing container 12 to which water is supplied by a clear water line 4. In the mixing container 12, the substrate mixture is mixed with water and optionally agitated. From the mixing container 12, the substrate mixture is conveyed via a pump 12' to a sink-float basin 13. There, jet nozzles 5 direct jets of liquid onto the rising light matter portion of the substrate mixture which is separated into a light matter phase (e.g. polyolefins) which is discharged via a bucket wheel 6 and a heavy matter phase which is deposited in the sedimentation basin 7 and conveyed via corresponding outlet lines 8 to a trough 14 wherein the heavy material (e.g. paper, PVC, dirt) from the sedimentation basin 7 and the paddle screw 11 and the dirty water is collected.

If the separated heavy matter consists essentially of paper and PVC components, it can be passed to a (double) screen belt press for dehydrating and further processed in the usual way.

The light matter phase discharged by the discharge bucket wheel 6 or paddle wheel is dehydrated, for instance by means of an arc screen 104. From the arc screen 104, the dehydrated light matter phase passes to a mixing vat 15 where it is mixed with clear water. From the mixing vat 15, the light matter phase is passed to a hydrocyclone 16 via a pump 15'. Residual heavy components or the underflow from the hydrocyclone 16 are passed via an arc screen 17 to a container 24. The water separated in the arc screen 17 is passed to a return water line 44. The light matter phase from the hydrocyclone 16 is passed via an arc screen 18 and a vibrating screen 19 to a screen belt press 20. Water separated in the arc screen 18, the vibrating screen 19 and in the screen belt press 20 is also fed to the return water line 44. The screen belt press 20 has a single pair of press rollers 45 and 46 of which the upper roller 45 is arranged closer to the inlet side end than the lower roller 46. The screen belt can be passed to the press rollers 45, 46 ascendingly or descendingly.

After passing the rollers 45, 46, the cleaned and dehydrated, still humid light matter phase is passed via conveyor belt 21, a vibrating conveyor trough 22 and a cellular wheel gate 47 to a hot air drier 23. The hot air drier 23 comprises at least one zig-zag-shaped air canal 48 in which an air stream directed upwards is maintained and entrains and thus dries the particles of the light matter phase. Particles which are too humid and form lumps too heavy to be entrained by the air stream are passed via a cellular wheel gate 49 to a container 28 for humid light matter portions and optionally returned to an inlet 50 for the cellular wheel gate 47. From the air canal 48, the particles are passed to a solid matter separator 51 conveniently formed by a cyclone. A fan or blower 58 superposed on the cyclone circulates the air stream through the zig-zag drier 23. The air stream is heated in a heater 52 prior to its entry into the zig-zag drier 23. Via a collecting tank 53, provided with a cellular wheel gate 54, for the light matter phase separated in the cyclone 51, this phase is charged onto a belt conveyor 29 passing the particles to a mixing and drying container. From this mixing and drying container or feeder 30 in which the particles are comminuted by means of a blade driven by a blade motor M and optionally mixed with additives, these are passed to an agglomerating extruder 31 with a coarse filter nozzle 32. Through this coarse filter nozzle 32, the agglomerated particles are passed to a melting mill or hot granulator 33. After passing a cutting mill 34, the melted and cut agglomerate is passed via a cutting mill discharge fan 34' to a mixing container 35 for fine dust extraction. The fine dust is sucked into a cloth bag 36. In the mixing container, the particles are mixed together and optionally mixed with additives in order to obtain the desired processing properties, such as, for instance, a certain melting index.

From the mixing container 35, the particles are passed to a degassing extruder 36 and a fine filter device 37. Downstream of the fine filter device 37, there is a granulating means 38 whose hot discharge drops into a water bath and is passed to a dehydrating screen 39 which passes the particles (granules) to a centrifuge 40. A pneumatic conveyor 41 passes the particles to a further cyclone 42, then they are separated in a container 43. Then the particles are fed to known means for further plastics processing and are there processed or blown into sheets, ropes or the like.

In order to limit water consumption, recycling of the water used is provided for. From the container 25 with fresh water supply 105, clear water or fresh water is supplied via pumps 25' to the paddle screw 11, the wet-grinding mill 10, the mixing container 12 and the sink-float basin 13. Fresh or clarified water is further supplied to the mixing tank 15 and, if necessary, to a collecting tank 26 for dirty water. The return water line 44 is passed into the collecting tank 26 for dirty water, the water separated in the arc screen 104 is also passed into the tank 26, as well as the water separated from the heavy matter withdrawn from the trough 14 by means of a submerged pump 14'; the submerged pump 14' passes the contents of the trough over an arc screen 55; the separated water is passed to the dirt water tank 26 and the solids are passed to a container 56 from where they are optionally, in particular if it is a heavy matter fraction consisting of paper and PVC, conveyed to a double screen belt press (not shown). The water withdrawn from the dirt water collecting tank 26 and the sludges contained therein are fed via a pump 26' to a clarification plant 27, for instance a settling basin, a filtering installation or the like, and the water separated in this clarification plant 27 is recycled to the clear water collecting container 25.

The sludges, particles and the like separated in the clarification plant 27 can be passed for further processing to separating means, for instance screen belt presses, in the form of flotation sludge or sedimentation sludge.

On principle, it is to be noted that the process according to the invention is particularly well suited for separating polyolefin portions (low density material phase) from PVC portions contained in coarsely presorted, comminuted domestic garbage fractions or for directly separating polyolefin portions from substrates containing paper and PVC, the separated paper and PVC substrate being subjected to further separation or processing. Essentially, comminuted sheets are separated from one another.

Any given liquid may be used as the separating or treatment liquid in the plant, in particular in the sink-float basin, the preferred liquid being water. If other liquids are used, separate liquid cycles can be set up for them.

Figure 2A:
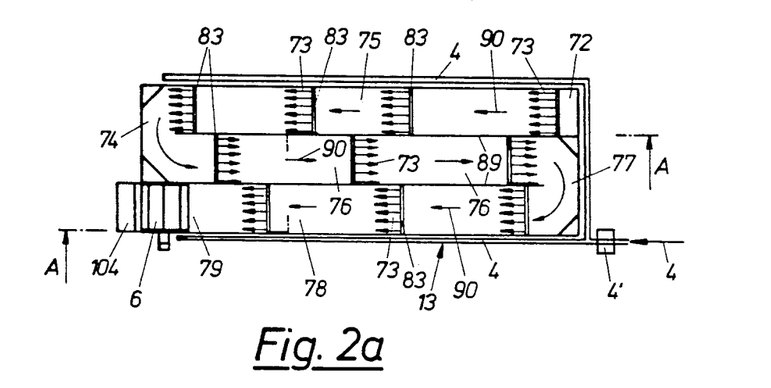
Figures 2B, 2C:
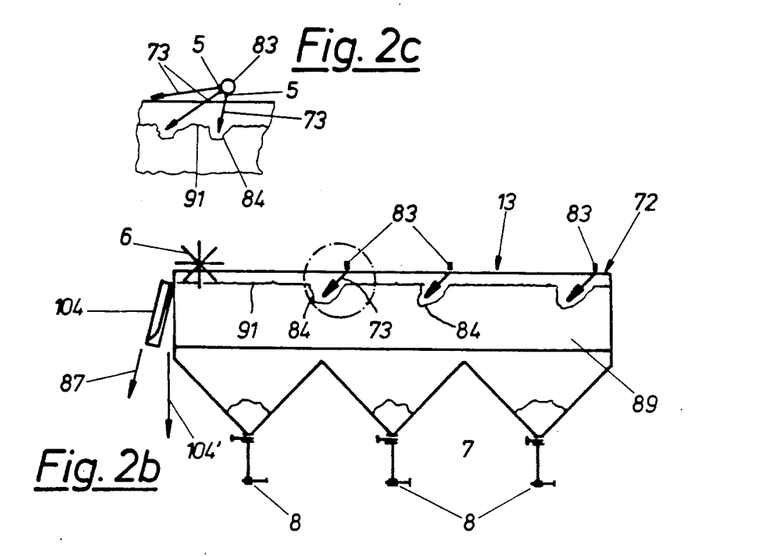

A sink-float basin 13 according to the invention shown in plan view in FIG. 2a consists of a basin which is subdivided into three adjacent zones 75, 76, 78 by means of longitudinal walls 89. The zone 75 is charged with a substrate mixture at its inlet end 72. Pipelines or blast connections 83 supporting jet nozzles 5 extend above the sink-float basin 13; the jet nozzles 5 spray jets 73 of liquid onto the surface 91 of the liquid in the sink-float basin 13. By means of the jets 73 of liquid, the substrate mixture treated is conveyed in the individual zones 75, 76, 78 connected by means of deflections 74, 77; this division of the basin results in a saving in its longitudinal extension. But it would be within the scope of the invention to form a correspondingly long sink-float basin without longitudinal subdivision. Other forms of sinkfloat basins are also possible, providing that they are formed for a suitably long retention time of the substrate mixtures. The advance movement of the substrate mixture is provided by the inclination of the jets 73 of liquid in relation to the surface 91 of the liquid, as this imparts an advance movement (arrows 90) to the substrate mixture. Particularly the rising light matter portions are conveyed in the direction towards the discharge-side end 79 of the sinkfloat basin 13. At the discharge-side end 79 of the sink-float basin 13, the light matter mixture removed from the substrate mixture is discharged by means of a paddle wheel 6. The paddle wheel 6 conveys the low density material onto an arc screen 104 in which residual water is separated and passed to the dirt water tank 26 via line 104'. The light matter is passed to the mixing tank 15 at 87. As shown in FIG. 2b, the jets 73 of liquid result in a whirling of the liquid as indicated at 84. In these sites of whirling 84, the substrate mixture charged into the sinkfloat basin 13 is whirled together with the liquid injected, the heavy fractions sink into the sedimentation sections or basins 7 of e.g. approximate truncated pyramid shape forming the bottom of the sink-float basin 13 and the light matter fraction is freed of adhering heavy portions or dirt. The whirling effect reaches to a depth of about 20 cm. The retention time of the light fractions in the basin preferably amounts to several minutes and essentially corresponds to the sinking time of the heavy fraction. The pressure exerted by the jets of liquid is approximately 3 to 4 bar.

The supply line 4 conveys the liquid to be sprayed on to the individual blast connections 83 arranged above the sink-float basin 13 and supporting the jet nozzles 5 by means of which the liquid is sprayed obliquely in the direction of the intended advance movement of the substrate mixture onto the surface 91 of the liquid.

The separating liquid provided in the sink-float basin may be water, but could also be a liquid of a specific gravity (relative density) different from that of water in order to adjust the separating behavior of the sink-float basin to the specific gravity of certain low density material phases.

It is possible to provide the pipelines 83 extending above the sink-float basin 13 with a plurality of jet nozzles arranged side by side and/or superposed and/or extending over the circumference of the pipelines 83. It is possible to provide for several jets 73 of liquid to be sprayed from one pipeline 83 onto the surface of the liquid at various angles of e.g. between 45 and 90 degrees.

The pipelines 83 and/or the jet nozzles 5 can be pivotally arranged or the jet cross sections of the jet nozzles may be formed adjustably. The liquid supply line 4 may be provided with a pressure control means 4' by means of which to adjust the jet pressure of the jets of liquid. The choice of the number of jet nozzles, of the spraying angle, the jet pressure and the like is made as a function of the desired separating or cleaning effect and the desired advancing speed.

The individual separating walls 89 of the sink-float basin 13 only reach to a certain depth of the sink-float basin 13, so that the individual sedimentation basins 7 are each associated with sections of all zones 75, 76, 78, which assures a comparatively uniform distribution over the sedimentation basins 7.

Figures 3, 4:
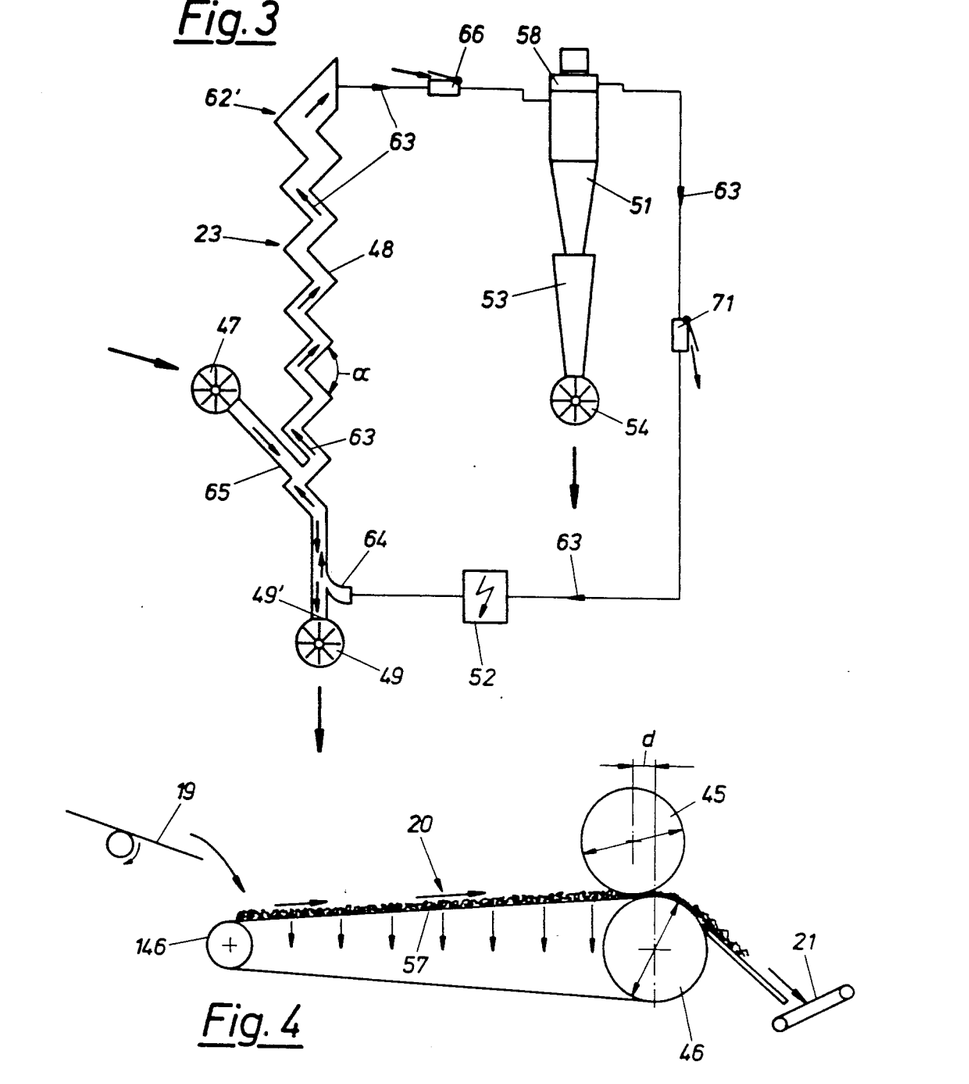
FIG. 3 shows a diagrammatic view of a hot air drier.
FIG. 4 shows a diagrammatic sectional view of a screen belt press.

FIG. 3 shows the hot air drier 23 in detail. The hot air drier 23 comprises an essentially vertically extending air canal 48 formed with zig-zag-shaped deflections through which the air is passed from bottom to top in a cycle shown by arrows 63. In the lower range of the air canal 48, the air is blown in through an inlet 64. At a distance above this inlet 64, a supply channel 65 through which the light matter phase is charged terminates and is closed on its other end by a cellular wheel gate 47. The air stream directed upwards in the air canal 48 entrains the material charged as a function of its weight. If the material charged is too heavy (too humid) or the air stream is adjusted too slow, it sinks down below the air inlet 64 and is discharged downwards through an orifice 49' closed by a cellular wheel gate 49 and can then be charged again via the inlet channel 65. Material entrained by the air stream rises upwards through the zig-zag-shaped air canal 48 and is dried on its way. The jags of the air canal 48 retain the light matter phase, in particular wet plastic sheet particles, until the desired drying degree is reached or until the particles have become so light that they are carried out of the air canal 48 by the air stream.

The drying effect is increased or an extended retention time of the particles to be dried in the air canal 48 is achieved if the end zone 62' of the air canal 48 expands diffusor-like, i.e. if the end zone 62' has a cross section continuously or stepwise increasing upwards.

The zig-zag-shaped path of the air stream in the air canal 48 can also be achieved, for instance, by means of obstacles, for instance by means of deflection plates projecting from the walls or the like.

When the water adhering to the particles is largely evaporated, these are passed to the separator 51, for instance a cyclone. Upstream of the cyclone, there is a suction or supply means 66 for dry or drier fresh air for replacing withdrawn humid air, this also permits an additional drying of the particles.

From the collecting tank 53 of the cyclone 51, the dried separated material is discharged via the cellular wheel gate 54. The fan or blower 58 maintains the air stream in the cycle.

Downstream of the cyclone 51, an exhaust or discharge means 71 for the humid air from the cycle is provided in the air cycle. Downstream of this exhaust means 71 in the cycle, there is the heating means 52 for the air supplied to the air canal 48. Due to the conveying behavior of the blower 58, the fresh air can be sucked into the cycle and the exhaust air can be expelled from it.

The adjustment of the amount of air supplied to the cycle or withdrawn from it is essentially determined by the extent of humidity of the goods to be dried and the desired drying speed. By an appropriate adjustment of the flowing rate of the air in the air canal 48, the retention time of the particles in the rising air stream can be controlled so as to obtain the desired degree of dryness. The continuous operation of the drying means 23 is particularly convenient.

FIG. 4 shows a screen belt press which may conveniently be used in the process according to the invention and in the plant according to the invention for dehydrating plastics sheet particles. This screen belt press may also be used independently of said process and said plant, however. The screen belt press 20 according to the invention is described in the following in connection with the process according to the invention and the plant according to the invention; it is understood, however, that this description is not limiting and that particularly the supply and discharge means described are available in similar forms in different fields of use.

From the supply means 19, for instance a vibrating screen or a vibrating channel or the like, the optionally predehydrated plastics sheet particles are charged onto a screen belt 57 after discharge from the hydrocyclone 16. The screen belt 57 passes around a breast roller 146 and a lower end or press roller 46. The screen belt 57 is made of plastics and extends slightly ascendingly, thus permitting a gravity dehydration of the plastic sheet particles charged. In order to optimize the drying degree, the particles are conveniently charged in a layer thickness of 10 to 60 mm, in particular of 30 to 40 mm.

An upper press roller 45 is arranged above the lower press roller 46; the plastics sheet particles are made to pass between the press rollers 45, 46 and the liquid clinging to the particles, in most cases water, is pressed out. The pressure dehydrated particles are charged onto the conveyor belt 21 for removal. It is convenient if at least the upper press roller 45 has a metal surface, preferably of steel, which reduces remoistening as compared to rubber rollers and also optimizes dehydration. The linear pressure achievable by means of the press rollers 45, 46 is adjusted to about 150 to 250 N/mm, preferably to about 180 N/mm.

The press rollers 45, 46 are conveniently of equal dimensions. In order to obtain adequate pre-pressing or dehydration, the axis of the upper press roller 45 is offset in relation to the axis of the lower press roller 46 in the direction towards the inlet end of the screen belt 57 by a distance d amounting to 20 to 70 mm, preferably about 50 mm.

The combination of the screen belt 57 of plastics with an upper press roller 45 made of metal, in particular steel, results in an optimal mechanical dehydration.

A preferred embodiment of the process initially mentioned, wherein the separation of low density materials from substrate mixtures is effected by subjecting the substrate mixtures to gravity separation in a sink-float basin and withdrawing the rising light matter phase and then to further processing, optionally subsequent to drying, with jets of liquid being sprayed onto the surface of the liquid and the rising substrates during their presence in the sink-float basin, provides that for separating plastics portions as light matter phase from optionally comminuted, in particular wet-ground, waste material fractions or presorted garbage fractions, the fractions are forced beneath the surface of the liquid in the sink-float basin by means of jets of liquid sprayed against the surface of the liquid in the sinkfloat basin at an angle of in particular at least 45 degrees, preferably of 45 to 90 degrees, conveniently of up to less than 90 degrees, and conveniently also advanced, and that moreover the conveying speed and the conveying path of the substrate mixture in the sink-float basin and its depth are so selected that the retention time of the light matter phase in the basin is at least the same as the sedimentation time of the sinking portions. A plant preferred according to the invention for separating light matter from substrate mixtures having a sink-float basin for sink-float separation and discharge means for the rising light matter phase, with a plurality, preferably a plurality of rows, of jet nozzles, in particular arranged side by side, being provided in particular above the sink-float basin, by means of which jet nozzles jets of liquid can be sprayed onto the surface of the liquid or onto the rising substrates, which plant is particularly suitable for carrying out the process described above, is characterized in that the jets of liquid are directed to the surface of the liquid at an angle of at least 45 degrees, in particular at an angle of 45 to 90 degrees, conveniently up to less than 90 degrees, and that said jets thus possess a directional component forcing the fractions beneath the surface of the liquid and whirling them and conveniently also possess a directional component conveying the fractions through the sink-float basin.

We claim:

1. A process for recovering low density plastic material from higher density waste material fractions, comprising the steps of:

gravity separating in a fluid medium a lighter phase from the higher density waste material fractions, the lighter phase including the low density plastic material; and centrifugally separating the low density plastic material from the gravity separated lighter phase.

2. A process for recovering low density plastic material from higher density waste material fractions, comprising the steps of:

gravity separating, using a sink-float separator including a fluid medium, a lighter phase from the higher density waste material fractions, the lighter phase including the low density plastic material; and centrifugally separating the low density plastic material from the gravity separated lighter phase.

3. The process of claim 2, wherein the step of gravity separating includes the steps of:

adding liquid to a precomminuted wet-ground mixture of the waste material fractions to be separated; and charging said sink-float separator with said mixture.

4. The process of claim 3, wherein said step of charging includes the additional step of simultaneous agitation.

5. The process of claim 2, wherein said step of gravity separating includes the step of forcing the liquid medium through a jet so as to advance and to force below the surface of said liquid medium the contents of said sink-float separator.

6. The process of claim 2, wherein said step of gravity separating includes the step of moving the contents of said separator along a coil-like path within said separator.

7. The process of claim 2, including the further step of causing said lighter phase to stay in a mixing container during the addition of liquid between said steps of gravity separating and centrifugally separating.

8. The process of claim 2, including the further step of removing a portion of the liquid content of the lighter phase separated during said step of gravity separating.

9. The process of claim 2, including the further step of hot air drying the light phase after said step of centrifugally separating.

10. The process of claim 9, including the further step of reducing the liquid content of said lighter phase before said step of hot air drying.

11. The process of claim 10, wherein said step of reducing includes the step of gravity filtration of said lighter phase.

12. The process of claim 10, wherein said step of reducing includes the step of squeezing out the liquid from said lighter phase.

13. The process of claim 10, including the additional steps of metering, at a metering site, the lighter phase into an ascendingly passing hot air stream which at least partially entrains and dehumidifies said lighter phase, and causing said air stream to pass the metering site with at least one abrupt deflection forming at least one zig-zag shaped zone.

14. The process of claim 13, wherein the step of causing the air stream to pass includes the step of causing the stream to pass upstream of the metering site.

15. The process of claim 13, including the further steps of causing the hot drying air to pass in a half-closed cycle, withdrawing, at a removal site, as exhaust air a portion of the air loaded with humidity from the lighter phase and replacing the air so withdrawn with drier fresh air, heating the air stream prior to its contact with the lighter phase, and discharging the dried lighter phase from the hot air stream at a site upstream of the removal site of the exhaust air from the cycle.

16. The process of claim 15, wherein said step of replacing occurs at a site upstream of the removal site of the humid exhaust air.

17. The process of claim 2, including the step of dehydrating with a double screen belt press the higher density materials separated during the step of gravity separating.

18. The process of claim 2, wherein the lighter phase includes predehydrated plastics sheet particles.

19. The process of claim 2, including the further step of charging the low density material phase onto a screen belt after the step of centrifugally separating.

20. The process of claim 2, wherein the step of centrifugally separating is carried out using a hydrocyclone which discharges the lighter phase, and including the further steps of charging the lighter phase onto a screen belt after discharge from said hydrocyclone, and subjecting the discharged lighter phase to gravity separation with subsequent pressure dehydration.

21. The process of claim 20, including the steps of charging the lighter phase onto said screen belt in a layer thickness of 10 mm to 60 mm and subjecting said phase to a linear pressure of about 150 N/mm to 250 N/mm.

22. The process of claim 21, including the steps of charging the lighter phase onto a screen belt in a layer thickness of about 30 mm to 40 mm, and subjecting said phase to a linear pressure of about 180 N/mm.

23. A plant for the separation of low density plastic material from higher density waste material fractions, comprising:

means for gravity separating liquid containing low density fractions, including the plastic material, from the waste material fraction;

means for withdrawing the low density fractions from the means for gravity separating;

means for centrifugally separating low density plastic material from the low density fractions; and means for drying the low density plastic material.

24. A plant for the separation of low density plastic material from higher density waste material fractions, comprising:

a sink-float basin for gravity separating liquid containing low density fractions, including the plastic material, as a lighter phase from the waste material fraction;

means for withdrawing the separate low density fractions from said sink-float basin;

means for party dewatering the withdrawn low density fractions;

means for adding water to the partly dewatered low density fractions, and a hydrocyclone for centrifugally separating low density material from the low density fractions with added water;

the centrifugally separated low density material comprising recovered low density plastic material.

25. A plant according to claim 24, wherein said hydrocyclone is located downstream of said sink-float basin.

26. A plant according to claim 24, further comprising means for wet-grinding, located upstream of said sink-float basin, adapted for reducing the low density fraction to approximately fingernail sized particles.

27. A plant according to claim 24, further including a mixing vat with means for liquid feeding, situated between said sink-float basin and said hydrocyclone.

28. A plant according to claim 24, further including separator means, located downstream of said hydrocyclone, for further separating the recovered low density plastic material.

29. A plant according to claim 28, wherein said separator means includes a vibrating screen.

30. A plant according to claim 29, wherein said separator means includes a screen belt press.

31. A plant according to claim 24, further including a hot air dryer to which the partly dewatered low density fractions are conducted.

32. A plant according to claim 31, wherein said hot air dryer includes an inlet site for receiving a hot air stream and a drying canal with a sudden flow deflector and a zig-zag-shaped section, through which canal a mass stream ascends, said canal further including means for metering the low density material phase, said means for metering situated above the inlet site for receiving the hot air stream, said dryer further including a discharge gate, located on a lower end of said drying canal, for discharging material not conveyed through the hot air stream.

33. A plant according to claim 32, wherein said means for metering is located in said drying canal at a site whereat the hot air stream has already been deflected at least one time.

34. A plant according to claim 32, wherein said canal has rectangular cross section that widens in the direction of air flow, successive sections of said canal extending in zig-zag form.

35. A plant according to claim 32, wherein said drying canal includes successively adjacent flow guiding surfaces which form therebetween an angle of about 20° to 120° in a flow deflection area.

36. A plant according to claim 32, wherein said drying canal includes successively adjacent flow guiding surfaces which form therebetween an angle of about 30° to 90° in a flow deflection area.

37. A plant according to claim 32, wherein said drying canal includes successively adjacent flow guiding surfaces which form therebetween an angle of about 40° to 70° in a flow deflection area.

38. A plant according to claim 24, wherein said sink-float basin includes a jet nozzle situated thereabove for injecting liquid onto a surface of liquid in the sink-float basin.

39. A plant according to claim 38, wherein said liquid from said jet nozzle is directed at an angle onto the surface of the liquid in said sink-float basin such that substrate mixtures in said basin are conveyed thereby and are forced beneath said surface.

40. A plant according to claim 39, further including a plurality of additional jet nozzles arranged across the width of said basin, each nozzle directing liquid at a different angle onto the surface of the liquid in said sink-float basin.

41. A plant according to claim 39, wherein said jet conveys substrate mixtures in said basin towards a discharge end of said basin.

42. A plant according to claim 24, wherein said sink-float basin includes a plurality of zones situated in a coil-like sequence.

43. A plant according to claim 24, further including a screen belt, situated after said hydrocyclone, having pair of press rollers for partly dehydrating the low density fractions.

44. A plant according to claim 43, wherein each press roller has substantially the same dimensions.

45. A plant according to claim 43, wherein said pair of press rollers in said screen belt includes an upper roller with a metal surface.

46. A plant according to claim 43, wherein said pair of press rollers in said screen belt includes an inlet end, an upper roller and a lower roller, said upper roller situated about 20 mm to 70 mm nearer the inlet end of the screen belt than the lower press roller.

47. A plant according to claim 46, wherein said upper roller is situated about 50 mm nearer the inlet end of the screen belt than the lower press roller.

48. A plant according to claim 47, further including means for moving said screen belt ascendingly.

* * * * *